United States Patent Office 3,290,715
Patented Dec. 13, 1966

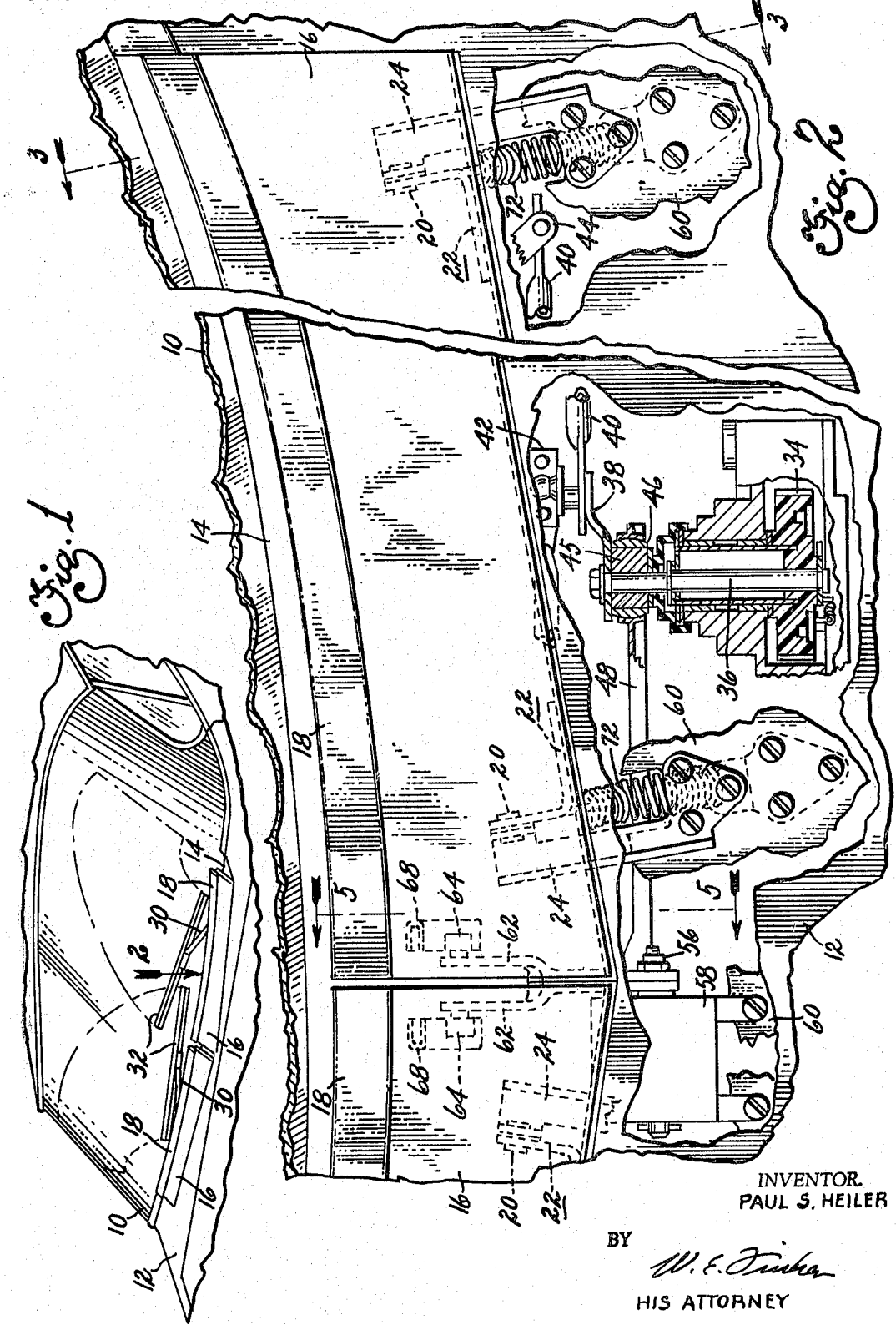

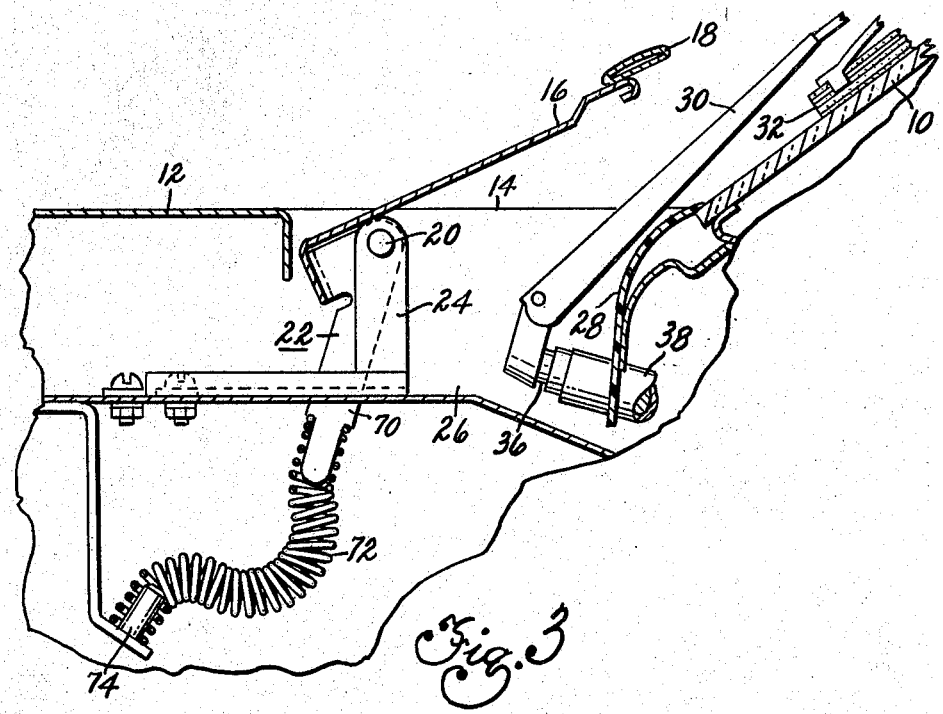
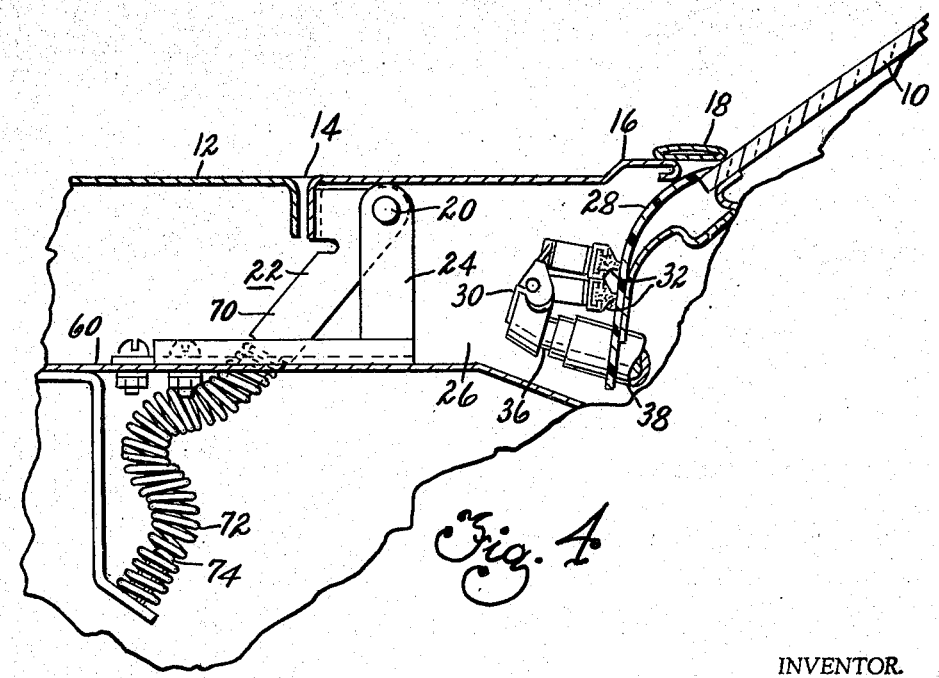

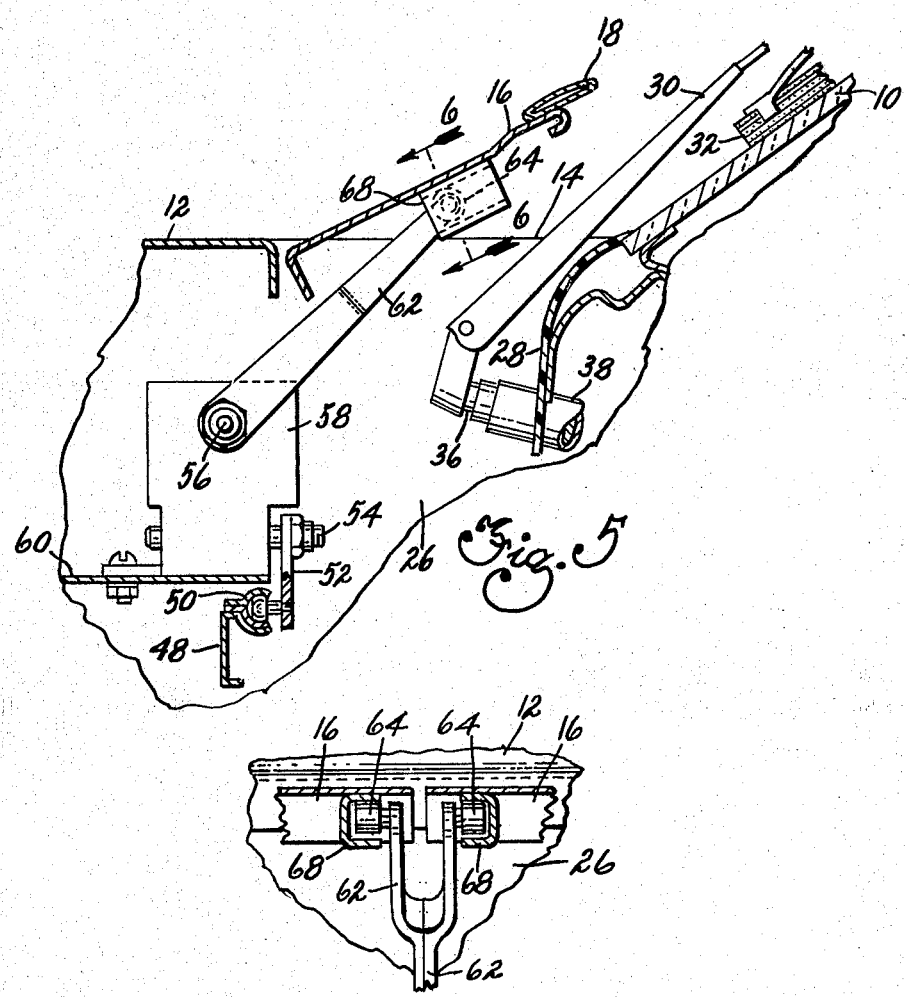

3,290,715
CONCEALED WINDSHIELD WIPER MECHANISM
Paul S. Heiler, Fairport, N.Y., assignor to General Motors Corporation, Detroit, Mich., a corporation of Delaware
Filed Jan. 26, 1965, Ser. No. 428,109
4 Claims. (Cl. 15—250.19)

This invention pertains to windshield cleaning mechanisms, and particularly to an improved wiper mechanism for a vehicular windshield which is concealed when not in use.

In my copending application Serial No. 386,917, filed August 3, 1964, now Patent No. 3,226,756, a concealed windshield wiper mechanism is disclosed comprising a pair of wiper arm and blade assemblies disposed in a well located forwardly of the windshield and including cover means which are automatically actuated by a variation in the throw of a crank assembly for moving the wiper blade and arm assemblies between operating and parked positions. The present invention relates to an improved mechanism of the aforesaid type wherein the cover means are positively driven during both opening and closing movements in combination with toggle spring means which apply a positive opening force and a positive closing force.

Accordingly, among my objects are the provision of concealed windshield wiper mechanism including automatically operated cover means which are both opened and closed by operation of the wiper motor; the further provision of concealed windshield wiper mechanisms including over-center spring means which provide a positive force for retaining the cover means in their open or closed positions; the still further provision of concealed windshield wiper mechanisms including wiper motor operated drive means for positively opening and closing the cover in combination with over-center spring means.

The aforementioned and other objects are accomplished in the present invention by establishing a driving connection between the cover operating linkage and the wiper motor during movement of the wiper blade and arm assemblies between their operating and parked positions in combination with toggle spring means operatively connected with the cover. In the disclosed embodiment the cover actuated linkage for each cover part includes a caged roller for imparting positive opening and closing movements thereto, and a pair of coiled toggle springs are operatively associated with each cover part for assisting in both opening and closing movement of their respective cover part, and in addition, apply a spring force which tends to maintain their respective cover part in either the open or the closed position.

Further objects and advantages of the present invention will be apparent from the following description, reference being had to the accompanying drawings wherein a preferred embodiment of the present invention is clearly shown, and wherein similar numerals depict similar parts throughout the several views.

In the drawings:

FIGURE 1 is a fragmentary perspective view of a vehicle equipped with the mechanism of the present invention.

FIGURE 2 is an enlarged view, partly in section and partly in elevation, with certain parts broken away, taken in the direction of arrow 2 of FIGURE 1.

FIGURE 3 is a fragmentary sectional view taken along line 3—3 of FIGURE 2 with the cover in the open position.

FIGURE 4 is a view similar to FIGURE 3 with the cover in the closed position.

FIGURE 5 is a fragmentary sectional view taken along line 5—5 of FIGURE 2.

FIGURE 6 is a fragmentary sectional view taken along line 6—6 of FIGURE 5.

Referring to FIGURE 1, a vehicle is shown having a windshield 10 with a forwardly extending cowl 12 having an opening 14 therein adapted to be substantially closed by a pair of hinged cover parts 16 located on opposite sides of the center line of the vehicle. As seen more particularly in FIGURES 3 through 5, each cover part 16 carries a portion of the lower reveal windshield molding 18. In addition, as seen in FIGURE 2, each cover part 16 is supported for pivotal movement by a pair of spaced hinge pins 20 which extend through brackets 22 attached to the cover parts 16 and stationary brackets 24 attached to the vehicle fire wall structure.

The opening 14 and the cowl structure 12 provides access to a well 26 disposed forwardly and beneath the windshield 10. The rear wall of the well 26 is constituted by a curved ramp 28 which guides and supports the wiper blades during movement between their operating and parked, or stowed, positions. The wiper mechanism for the windshield comprises a pair of wiper arms 30 having spring-hinge connected inner and outer sections and carry wiper blades 32. The wiper arms 30 are connected to spaced pivot shafts 36 journalled in housing 38 attached to the rear wall of the well 26. In accordance with conventional practice, the wiper blades 32 are movable in phase opposition across the outer surface of the windshield throughout paths that overlap in the central portion thereof, as seen in FIGURE 1.

Referring to FIGURE 2, the wiper blade and arm assemblies are oscillated by a drive mechanism including the unidirectional electric motor, not shown, which is coupled to a worm wheel 34 of a variable throw crank assembly of the type disclosed in Patent 2,985,024. This variable throw crank assembly includes a drive shaft 36 eccentrically journalled in the worm wheel 34 and having an interruptible driving connection therewith such that during normal running operation of the wiper motor, the drive shaft 36 rotates with the worm wheel 34 in an orbital path about the axis of the worm wheel. A crank arm 38 attached to the outer end of drive shaft 36 is shown having a pair of connecting links 40 and 42 pivotally connected thereto, the drive link 40 being shown having its other end connected by a crank arm 44 attached to one of the pivot shafts 36. The other connecting link is coupled through a suitable reversing linkage mechanism to the other pivot shaft so that the two pivot shafts will be oscillated conjointly in phase opposition.

The drive shaft 36 has its axis shifted during parking movement, and this variation in the position of the drive shaft is utilized to actuate the cover parts 16 during movement of the wiper blade and arm assemblies to and from their parked position. Accordingly, an eccentric 45 is attached to the drive shaft 36 and supports a spherical bearing 46 on which the inner end of a link 48 is journalled. The axis of the eccentric 45 is coincidental with the axis of the worm wheel 34, and hence during normal running movement of the wiper mechanism no transverse movement will be imparted to the link 48. However, when the axis of the drive shaft 36 is shifted during parking of the wiper arm and blade assemblies, the eccentric 45 will likewise be shifted so as to impart transverse movement to the drive link 48 as seen in FIGURE 2.

The other end of the drive link 48 is connected through a ball and socket joint 50 to a crank arm 52. The crank arm 52 is connected to a shaft 54 having a 45° helical sector gear, not shown, attached thereto in accordance with the aforementioned copending application Serial No. 386,917, which meshes with a second 45° helical sector gear, not shown, attached to a transversely arranged shaft 56, the gears being disposed in a housing 58 attached to the vehicle fire wall 60. The shaft 56 has a pair of drive arms 62 attached thereto which carry rollers 64 adjacent their outer ends. The rollers 64 are disposed in channel shaped guides, or tracks, 68 attached to the cover parts 16 and, are thus "caged" whereby counterclockwise pivotal movement of the arms 62 as seen in FIGURE 5 will impart opening movement to the cover parts 16, and clockwise movement of the arms 62 will impart closing movement to the cover parts 16.

In addition to the positive drive connection between the rollers 64 and their respective cover tracks 68, my improved structure contemplates the use of toggle springs for applying a positive force to retain the cover parts in their open or closed positions and, in addition, to assist in opening and closing movements of the cover parts. To achieve this result, each hinge bracket 22 attached to the cover part 16 is formed with an integral downwardly extending finger or tab 70 which receives and guides one end of an elongate coil type toggle spring 72. The other end of each toggle spring 72 is seated on a pin 74 attached to the vehicle fire wall structure 60. The configuration of each toggle spring 72 is such that whenever the finger 70 is moved over-center, or across the center line of the pin 74, the spring 72 will move with snap action to one or the other of its extreme positions as seen in FIGURES 3 and 4. In the position depicted in FIGURE 3, the springs 72 apply a positive force to the cover parts 16 which maintain the cover parts in the open position. During movement of the cover parts to the closed position, the spring 72 will apply a positive force retaining the cover parts in the closed position as seen in FIGURE 4 and will also assist in moving the cover parts between the open and closed positions. The added spring force of the toggle springs is also sufficient to break the cover parts loose if their movement in restricted by ice, snow, or other foreign matter.

While the embodiment of the present invention as herein disclosed constitutes a preferred form, it is to be understood that other forms might be adopted.

What is claimed is as follows:

1. A windshield cleaning mechanism for a vehicle having a windshield, a cowl with a transversely extending well having an access opening and hinged cover means for closing the access opening, including, a pair of spaced oscillatable windshield cleaner assemblies, drive means for said cleaner assemblies including a variable throw crank operable to impart conjoint oscillation to said cleaner assemblies across the outer surface of said windshield and to move the cleaner assemblies to parked positions wherein said cleaner assemblies are disposed within said well, cover operating linkage means drivingly connected to, and automatically actuated upon variation in the throw of said crank during movement of said cleaner assemblies between their parked and operating positions for positively opening said cover means during movement of said cleaner assemblies to their operating position and positively closing said cover means during movement of said cleaner assemblies to their parked position, and over-center actuated toggle spring means operatively connected with said cover means for assisting in moving said cover means between open and closed positions and for maintaining said cover means in either its open or closed position.

2. Windshield cleaning mechanism for a vehicle having a windshield, a cowl with a transversely extending well having an access opening and hinged cover means for closing the access opening, and including, a pair of spaced oscillatable cleaner assemblies, drive means including a variable throw crank operable to impart conjoint oscillation to said cleaner assemblies across the outer surface of said windshield and to move said cleaner assemblies to and from said well, cover operating linkage means drivingly connected to, and automatically actuated upon variation of throw of said crank during movement of said cleaner assemblies to and from said well for moving said cover means between open and closed positions including caged roller means, and toggle spring means operatively connected with said cover means for assisting in opening and closing movements thereof and for applying a positive force to maintain said cover means in open or closed position.

3. The windshield cleaning mechanism as set forth in claim 2 wherein said caged roller means comprises a channel shaped track attached to said cover means and a roller carried by a pivotally movable arm, said roller being disposed within said track.

4. The windshield cleaning mechanism as set forth in claim 2 wherein said cover means comprises two cover parts, and wherein the toggle spring means for each cover part comprises a pair of elongate coil springs, one end of each of said coil spring being drivingly connected with one of said cover parts and the other end of each of said coil spring being attached to said vehicle such that during opening and closing movement of each cover part the spring is moved over-center.

References Cited by the Examiner

UNITED STATES PATENTS 2,800,324   7/1957   Coe _____ 268—75
3,226,756   1/1966   Heiler _____ 15—250.19

CHARLES A. WILLMUTH, *Primary Examiner.*